(12) United States Patent
Kawakami et al.

(10) Patent No.: US 10,807,008 B2
(45) Date of Patent: Oct. 20, 2020

(54) CONTENT DELIVERY SERVER, CONTENT DELIVERY METHOD, AND CONTENT DELIVERY PROGRAM

(71) Applicant: DWANGO Co., Ltd., Tokyo (JP)

(72) Inventors: Nobuo Kawakami, Tokyo (JP); Hiroaki Saito, Tokyo (JP); Takashi Kojima, Tokyo (JP); Kenichi Miyazaki, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/638,611

(22) PCT Filed: Sep. 27, 2018

(86) PCT No.: PCT/JP2018/035881
§ 371 (c)(1),
(2) Date: Feb. 12, 2020

(87) PCT Pub. No.: WO2019/065818
PCT Pub. Date: Apr. 4, 2019

(65) Prior Publication Data
US 2020/0171393 A1 Jun. 4, 2020

(30) Foreign Application Priority Data
Sep. 29, 2017 (JP) ................. 2017-190910

(51) Int. Cl.
*A63F 13/86* (2014.01)
*A63F 13/537* (2014.01)
(Continued)

(52) U.S. Cl.
CPC ............ *A63F 13/86* (2014.09); *A63F 13/537* (2014.09); *H04N 21/2668* (2013.01); *H04N 21/4781* (2013.01); *H04N 21/482* (2013.01)

(58) Field of Classification Search
None
See application file for complete search history.

(56) References Cited

U.S. PATENT DOCUMENTS

2002/0035516 A1* 3/2002 Arima ................ G06Q 30/0641
705/26.8
2008/0212937 A1* 9/2008 Son ...................... H04N 21/435
386/241
(Continued)

FOREIGN PATENT DOCUMENTS

| JP | 3916648 B1 | 5/2007 |
| JP | 2013-63296 A | 4/2013 |
| JP | 2016-116638 A | 6/2019 |

OTHER PUBLICATIONS

Translation of International Search Report and Written Opinion dated Nov. 20, 2018 in corresponding application No. PCT/JP2018/035881; 9 pgs.

(Continued)

*Primary Examiner* — Ronald Laneau
(74) *Attorney, Agent, or Firm* — Maier & Maier, PLLC

(57) ABSTRACT

A content delivery server that delivers a content screen image of content played by a player terminal to a plurality of viewer terminals, wherein the content delivery server includes a control unit for displaying, on the viewer terminals, options for manipulating an object in the content; and a communication unit that receives, from the viewer terminals, the result selected from among the options; the control unit performing an operation on the object within the content on the basis of the selected result, and the content screen image following the operation on the object being delivered from the communication unit to the player terminal and the viewer terminals.

16 Claims, 12 Drawing Sheets

(51) Int. Cl.
*H04N 21/2668* (2011.01)
*H04N 21/478* (2011.01)
*H04N 21/482* (2011.01)

(56) References Cited

U.S. PATENT DOCUMENTS

2015/0082333 A1    3/2015  Belton
2016/0140527 A1*   5/2016  Sugaya .............. G06Q 30/0623
                                                      705/26.61
2020/0009458 A1*   1/2020  Onda ...................... A63F 13/86

OTHER PUBLICATIONS

[Online], Dec. 2009 (Ogue, Takuya et al. Massively Multi spectator Online Collision Detection. 17th Workshop on Interactive Systems and Software.), 2 pgs.
Notice of Reasons for Refusal dated Aug. 2, 2018 in corresponding application No. JP2017-190910; 10 pgs.
Decision to Grant a Patent dated Nov. 12, 2018 in corresponding application No. JP2017-190910; 5 pgs.

* cited by examiner

CONTENT DELIVERY SERVER, CONTENT DELIVERY METHOD, AND CONTENT DELIVERY PROGRAM

FIELD

The present disclosure relates to a content delivery server, a content delivery method, and a content delivery program which deliver content played by a player to a viewer.

BACKGROUND

In the related art, a game in which game progress is varied by a plurality of players is suggested.

For example, as illustrated in Patent Document 1, there is disclosed a technology of providing scene data without delay even though the selection input of some players is delayed or the selection input is not performed when providing a game in which scene data is changed by the selection input of a plurality of players.

Patent Document 1: Japanese Patent No. 3916648

SUMMARY

However, in Patent Document 1, with regard to options in the game, a configuration in which an operation is performed by manipulating an object such as a main character is not described. Therefore, in an action game, a role playing game, and the like, there is a problem that it is difficult for a viewer to intuitively recognize options such as a direction in which the viewer desires to move the object in game progress. In addition, with regard to live delivery of a game in which a player plays, a system in which a viewer participates is not disclosed.

Accordingly, an object of the present disclosure is to provide a content delivery server, a content delivery method, and a content delivery program which display options with which an object in content can be operated in an intuitively recognizable manner, and are capable of allowing a viewer to participate in content progress.

To solve the problem, according to the present disclosure, there is provided a content delivery server that delivers a content screen of content played by a player terminal to a plurality of viewer terminals. The content delivery server includes: a control unit that causes the viewer terminals to display options for manipulating an object in the content; and a communication unit that receives a result selected among the options from the viewer terminals. The control unit performs an operation of the object in the content on the basis of the selection result. A content screen after the operation of the object is delivered from the communication unit to the player terminal and the viewer terminals.

In addition, according to the present disclosure, there is provided a content delivery method for delivering a content screen of content played by a player terminal to a plurality of viewer terminals. The content delivery method includes steps of: causing the viewer terminals to display options for manipulating an object in the content by a control unit; receiving a result selected among the options from the viewer terminals by a communication unit; performing an operation of the object in the content on the basis of the selection result by the control unit; and delivering a content screen after the operation of the object to the player terminal and the viewer terminals by the communication unit.

In addition, according to the present disclosure, there is provided a content delivery program for delivering a content screen of content played by a player terminal to a plurality of viewer terminals. The content delivery program causes a computer to execute steps of: causing the viewer terminals to display options for manipulating an object in the content; receiving a result selected among the options from the viewer terminals; performing an operation of the object in the content on the basis of the selection result; and delivering a content screen after the operation of the object to the player terminal and the viewer terminals.

In addition, according to the present disclosure, there is provided a content delivery server that delivers a content screen of content played by a player terminal to a plurality of viewer terminals. The content delivery server includes: a control unit that causes the viewer terminals to display options for manipulating an object in the content; and a communication unit that receives a result selected among the options from the viewer terminals. The control unit causes the player terminal to display the selection result and performs an operation of the object in the content on the basis of an instruction from the player terminal. A content screen after the operation of the object is delivered from the communication unit to the player terminal and the viewer terminals.

In addition, according to the present disclosure, there is provided a content delivery method for delivering a content screen of content played by a player terminal to a plurality of viewer terminals. The method includes steps of: causing the viewer terminals to display options for manipulating an object in the content by a control unit; receiving a result selected among the options from the viewer terminals by a communication unit; displaying the selection result on the player terminal and performing an operation of the object in the content on the basis of an instruction from the player terminal by a control unit; and delivering a content screen after the operation of the object to the player terminal and the viewer terminals by the communication unit.

In addition, according to the present disclosure, there is provided a content delivery program for delivering a content screen of content played by a player terminal to a plurality of viewer terminals. The content delivery program causes a computer to execute steps of: causing the viewer terminals to display options for manipulating an object in the content; receiving a result selected among the options from the viewer terminals; displaying the selection result on the player terminal; performing an operation of the object in the content on the basis of an instruction from the player terminal; and delivering a content screen after the operation of the object to the player terminal and the viewer terminals.

According to the content delivery server, the content delivery method, and the content delivery program, it is possible to display options with which an object in content can be operated in an intuitively recognizable manner, and to allow a viewer to participate in content progress.

DETAILED DESCRIPTION

Hereinafter, embodiments will be described. Note that, the embodiments to be described below are not intended to limit the content of the present disclosure in the appended claims. In addition, it cannot be said that all of configurations to be described in the embodiments are essential constituent elements of the present disclosure. In the following embodiments, description will be given in a state in which a game is set as content, but the content may be applied to a service in which a player solve a problem, or educational content in addition to the game.

First Embodiment

Description will be given of a content delivery system 1 in which options are displayed on a screen of a smartphone that is a viewer terminal and an operation of an object is performed on the basis of a selected result according to a first embodiment of the present disclosure. Note that, in the following description, a viewer A is a person who uses a viewer terminal 131a and a viewer B is a person who uses a viewer terminal 131b. The object is a game character in game content, and operates when being manipulated by a player. Note that, the object is not limited to the game character, and may be a piece constituting a sliding block puzzle such as eight puzzles and fifteen puzzles.

<Configuration>

First, description will be given of a configuration and an overview of the content delivery system 1 including a content delivery server 111 configured to deliver game content played by a player to viewers according to this embodiment with reference to FIG. 1.

Figure 1:
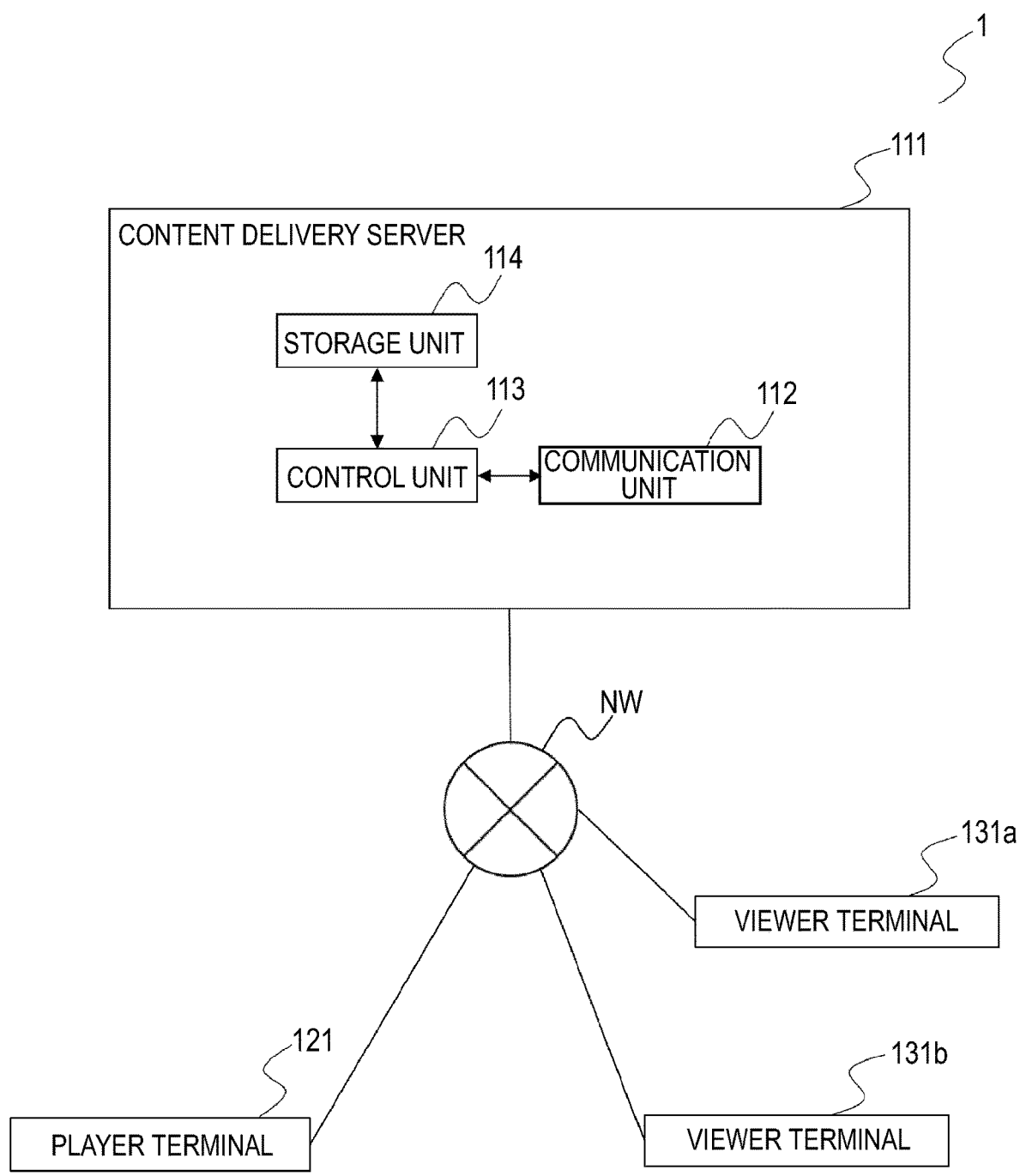
FIG. 1 is a schematic block diagram illustrating a configuration of a content delivery system 1 according to an embodiment of the present disclosure.

As illustrated in FIG. 1, the content delivery system 1 of this embodiment has a configuration in which the content delivery server 111, a player terminal 121, and the viewer terminals 131a and 131b can be connected to a network NW such as the Internet.

The content delivery server 111 transmits game content to the player terminal 121. In addition, the content delivery server 111 receives game manipulation information transmitted from the player terminal 121 and progresses the game content on the basis of the game manipulation information. In addition, the content delivery server 111 delivers the game content in progress to the viewer terminals 131a and 131b. The content delivery server 111 includes a communication unit 112, a control unit 113, and a storage unit 114.

The communication unit 112 is a communication interface that performs communication with the player terminal 121 and the viewer terminals 131a and 131b through the network NW. The communication unit 112 receives the game manipulation information transmitted from the player terminal 121, or selection information transmitted from the viewer terminals 131a and 131b.

The control unit 113 progresses game content stored in a storage unit 114 to be described later on the basis of the game manipulation information transmitted from the player terminal 121. In addition, the control unit 113 determines a progress state of the game content, and determines a direction, in which a game character that is an object manipulated by a player in the game content can move, as an option display region. In addition, the control unit 113 displays options indicating a movement direction of the game character in a manner of being superimposed on a game screen on the basis of the determined option display region. In addition, the control unit 113 sums up options transmitted from the viewer terminals 131a and 131b.

The storage unit 114 stores a plurality of pieces of game content.

Next, a configuration and an operation of the player terminal 121 will be described. The player terminal 121 is a terminal apparatus that is used by a game player, and is an information processing apparatus such as a smartphone, a mobile phone, a PHS, a computer, a game apparatus, a PDA, a portable gaming machine, a watch, a smart watch, a head-mounted display, a wearable display, and an image generating apparatus. In addition, the player terminal 121 is an apparatus that can be connected to the content delivery server 111 through the network NW such as the Internet (WAN) and a LAN. Note that, a communication line between the player terminal 121 and the content delivery server 111 may be a wired line or a wireless line. The player terminal 121 displays game content transmitted from the content delivery server 111 as a game image. A player manipulates the player terminal 121 while viewing the game image that is displayed. Manipulating means may be touching of a display screen by a touch panel or input by keys independent from the display screen. The player terminal 121 transmits a manipulation result to the content delivery server 111 as game manipulation information.

Next, a configuration and an operation of the viewer terminals 131a and 131b will be described. The viewer terminals 131a and 131b are terminal apparatuses which are used by viewers, and are information processing apparatuses such as a smartphone, a mobile phone, a PHS, a computer, a game apparatus, a PDA, a portable gaming machine, a watch, a smart watch, a head-mounted display, a wearable display, and an image generating apparatus. In addition, the viewer terminals 131a and 131b are apparatuses which can be connected to the content delivery server 111 through the network NW such as the Internet (WAN) and a LAN. Note that, a communication line between the viewer terminals 131a and 131b and the content delivery server 111 may be a wired line or a wireless line. The viewer terminals 131a and 131b display a game screen transmitted from the content delivery server 111. In addition, the viewer terminals 131a and 131b can performs selection input of options displayed in a manner of being superimposed on the game screen. Input means may be touching of the display screen by a touch panel or input by keys independent from the display screen. The viewer terminals 131a and 131b transmit input information to the content delivery server 111 as selection information.

The player terminal 121 or the viewer terminals 131a and 131b may access the content delivery server 111 by dedicated application software that is installed. In addition, the player terminal 121 or the viewer terminals 131a and 131b may access the content delivery server 111 by using an operation environment (application programming interface (API), a platform, or the like) provided by the content delivery server 111 or an additional server.

<Game Image>

Description will be given of a game image that is transmitted from the content delivery server 111 to the player terminal 121 and the viewer terminals 131a and 131b to be displayed according to the first embodiment of the present disclosure with reference to FIG. 2 to FIG. 7. It is assumed that the player terminal 121 and the viewer terminals 131a and 131b are smartphones.

Figure 2:
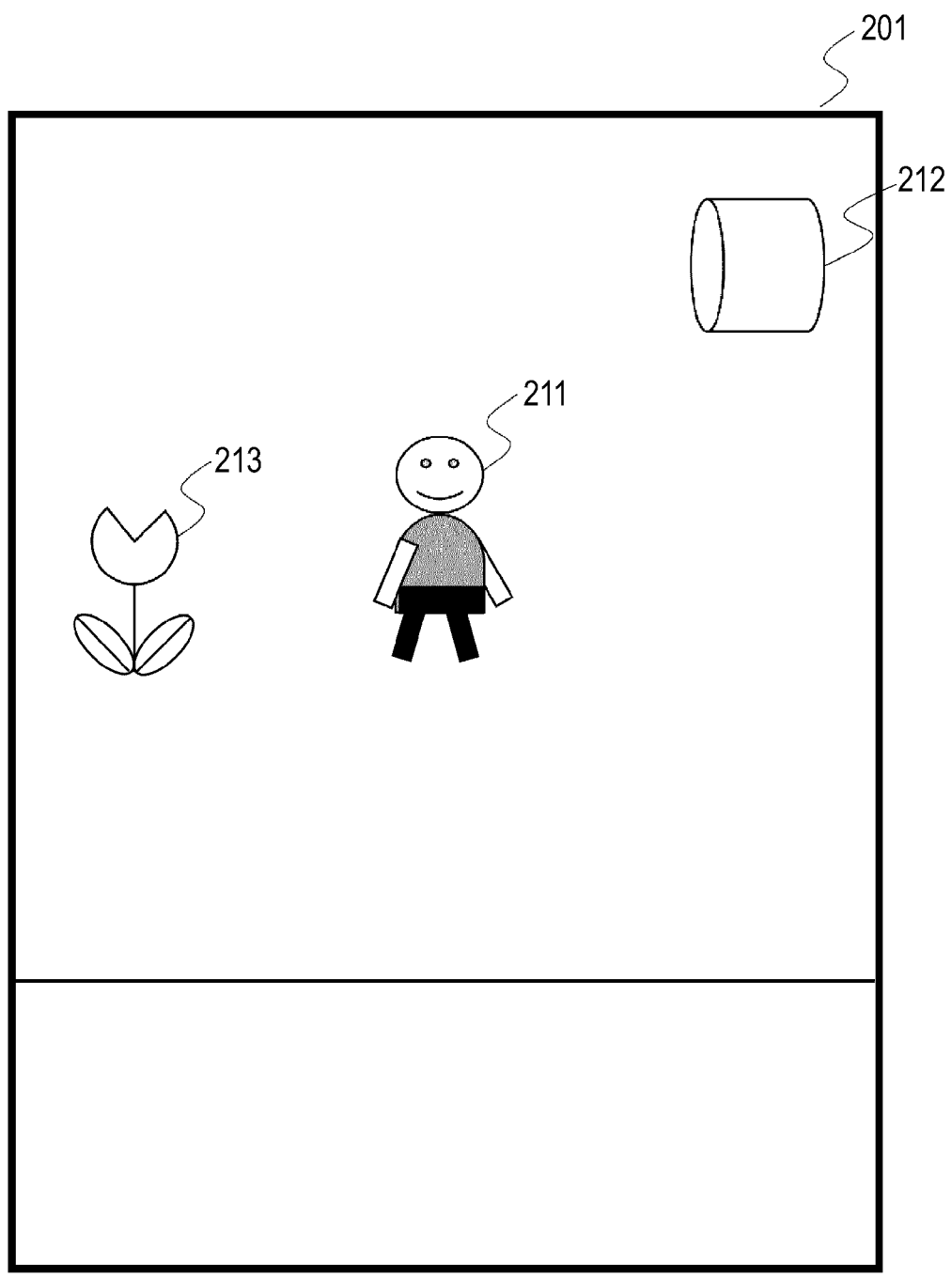
FIG. 2 is a view illustrating a display screen of a player terminal and a viewer terminal according to a first embodiment.

In FIG. 2, a game character 211 that can be manipulated by a player, and a tank 212 and a flower 213 are displayed on a smartphone display screen 201 as a display icon. In a case where the game character moves, the game character does not move with respect to a display region of the smartphone display screen 201, and a display background such as the tank 212 and the flower 213 moves, thereby expressing movement of the game character. However, the game character itself may move.

Figure 3:
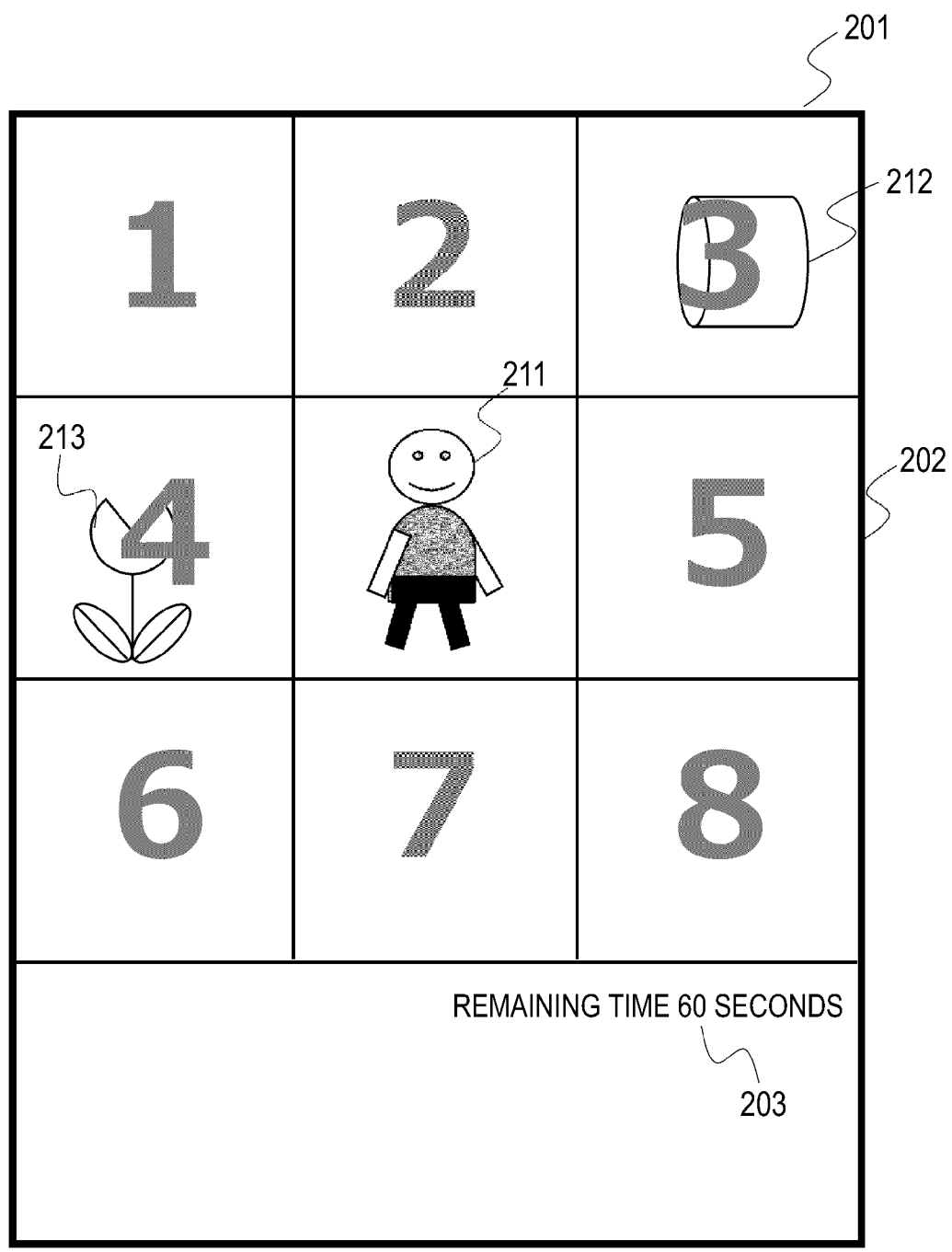
FIG. 3 is a view illustrating a state in which options are displayed in a manner of being superimposed on the display screen of the player terminal and the viewer terminal according to the first embodiment.

FIG. 3 illustrates a game image that is displayed in a case where a player asks viewers for an opinion on game progress, and desires to encourage participation. Square-shaped option frames 202 are displayed at the periphery of the game character 211. The option frames are disposed in eight directions, and numbers from one to eight are respectively displayed in the frames. In addition, a display time 203 indicating a selectable time limit of the options is disposed on a lower portion of the game image. The game image is transmitted from the content delivery server 111 to the viewer terminals 131a and 131b, and viewers of the viewer terminals touch an option frame in a direction in which the viewers desire to move the game character 211.

Figure 4:
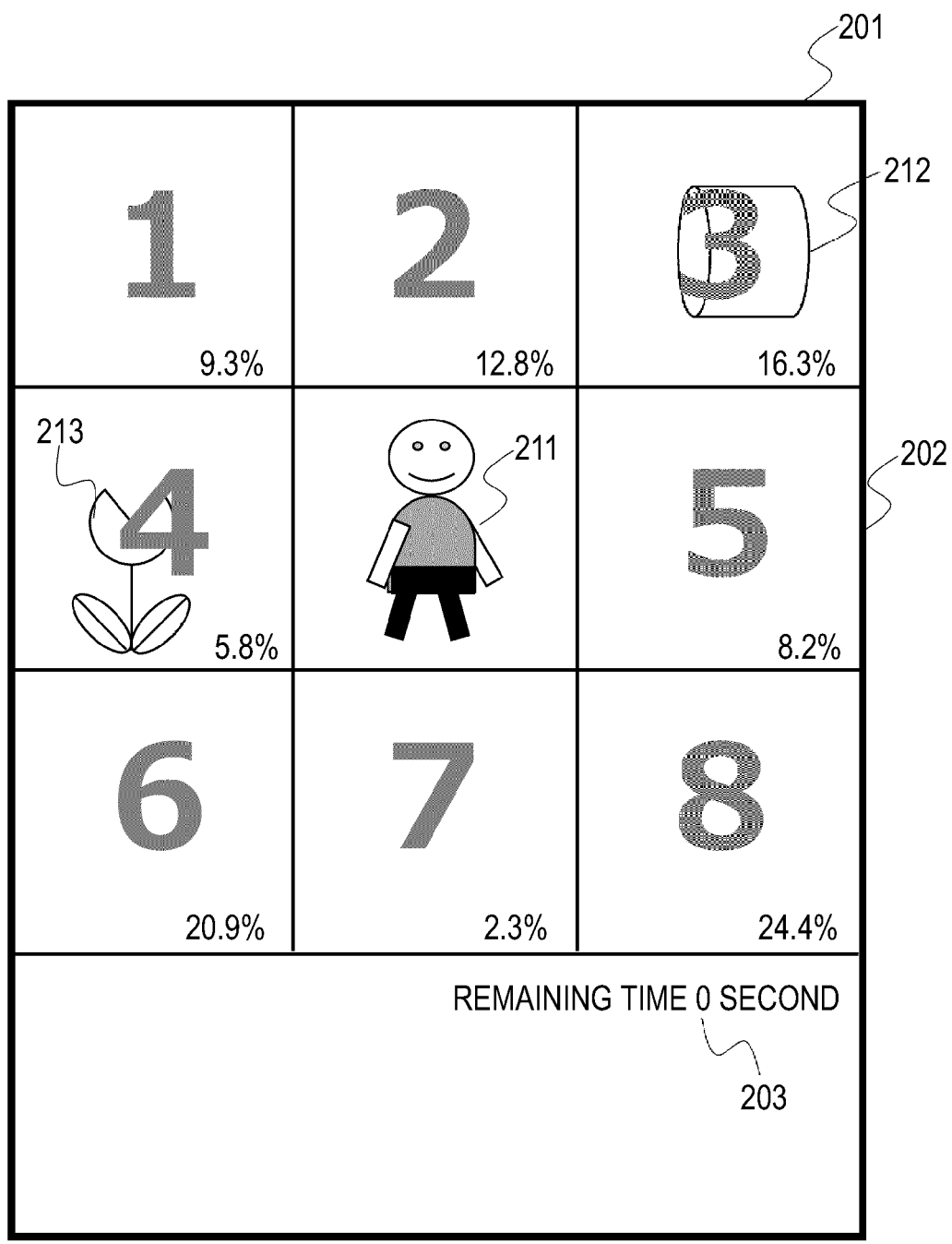
FIG. 4 is a view illustrating a state in which selection ratios are displayed in a manner of being superimposed on the display screen of the player terminal and the viewer terminal according to the first embodiment.

In FIG. 4, selection ratios of the option frames are displayed in a manner of being superimposed on the game image after the time limit. Hereinbefore, with regard to the viewer terminals in the content delivery system 1, two pieces of the viewer terminals 131a and 131b have been described as a representative, but more viewer terminals can be used. Accordingly, a summed-up result (selection result) of the number of the option frames selected is displayed as a ratio on the basis of selection information from a plurality of the viewer terminals. In FIG. 4, an option frame of "8" is selected in a ratio of 24.4%. Accordingly, the game character 211 moves in a direction of the option frame of "8". That is, the control unit 113 determines a movement direction of the game character 211 in accordance with decision by majority. The control unit 113 performs control of moving the background in an opposite direction of the option frame "8" to allow the player or the viewers to view the game character 211 that is moving in the direction of "8".

Figure 5:
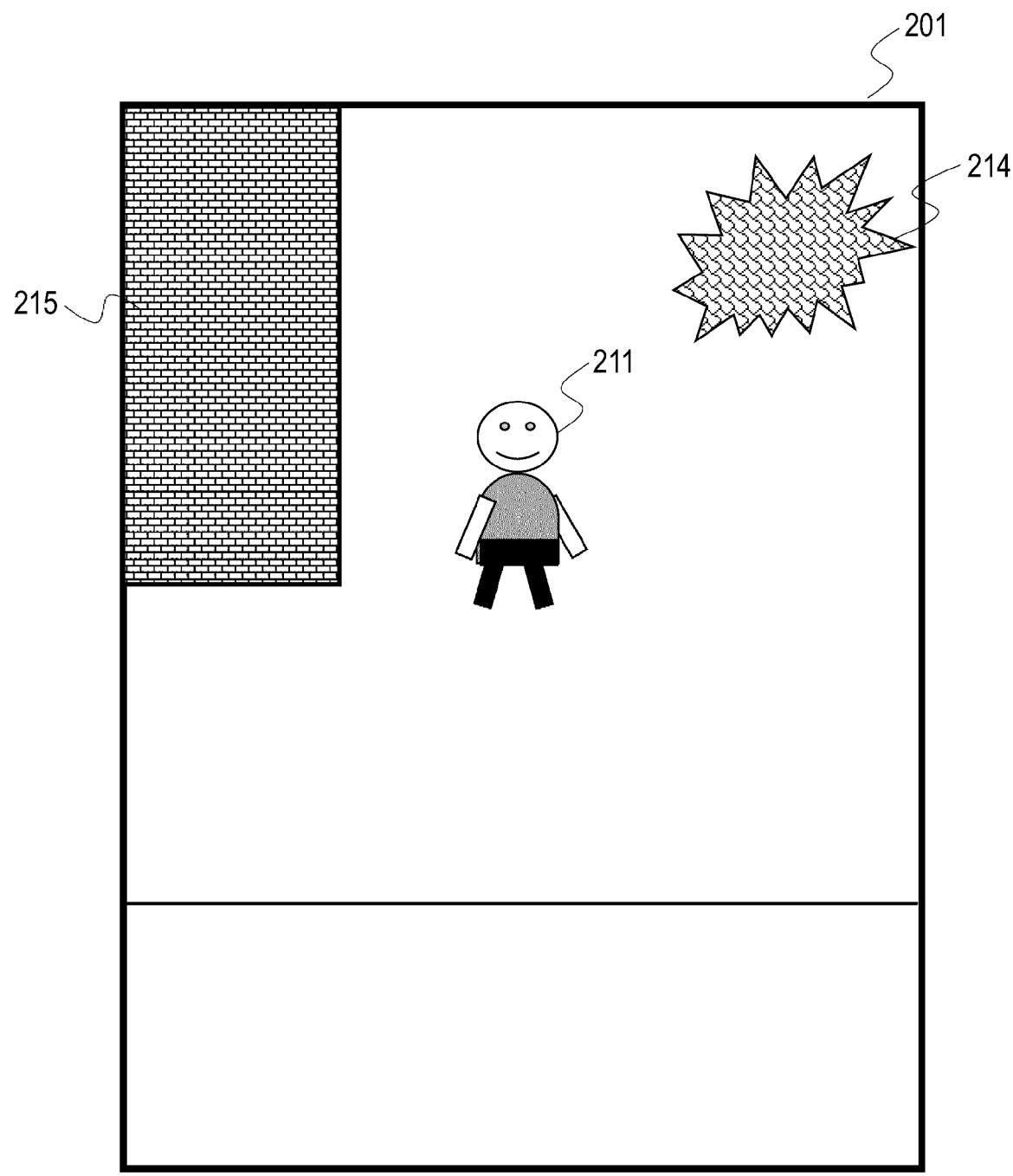
FIG. 5 is a view illustrating the display screen of the player terminal and the viewer terminal according to the first embodiment.

In FIG. 5, the game character 211 that can be manipulated by the player, an obstacle 214, and a wall 215 are displayed on the smartphone display screen 201. The game character 211 cannot move to a direction in which the obstacle 214 or the wall 215 exists.

Figure 6:
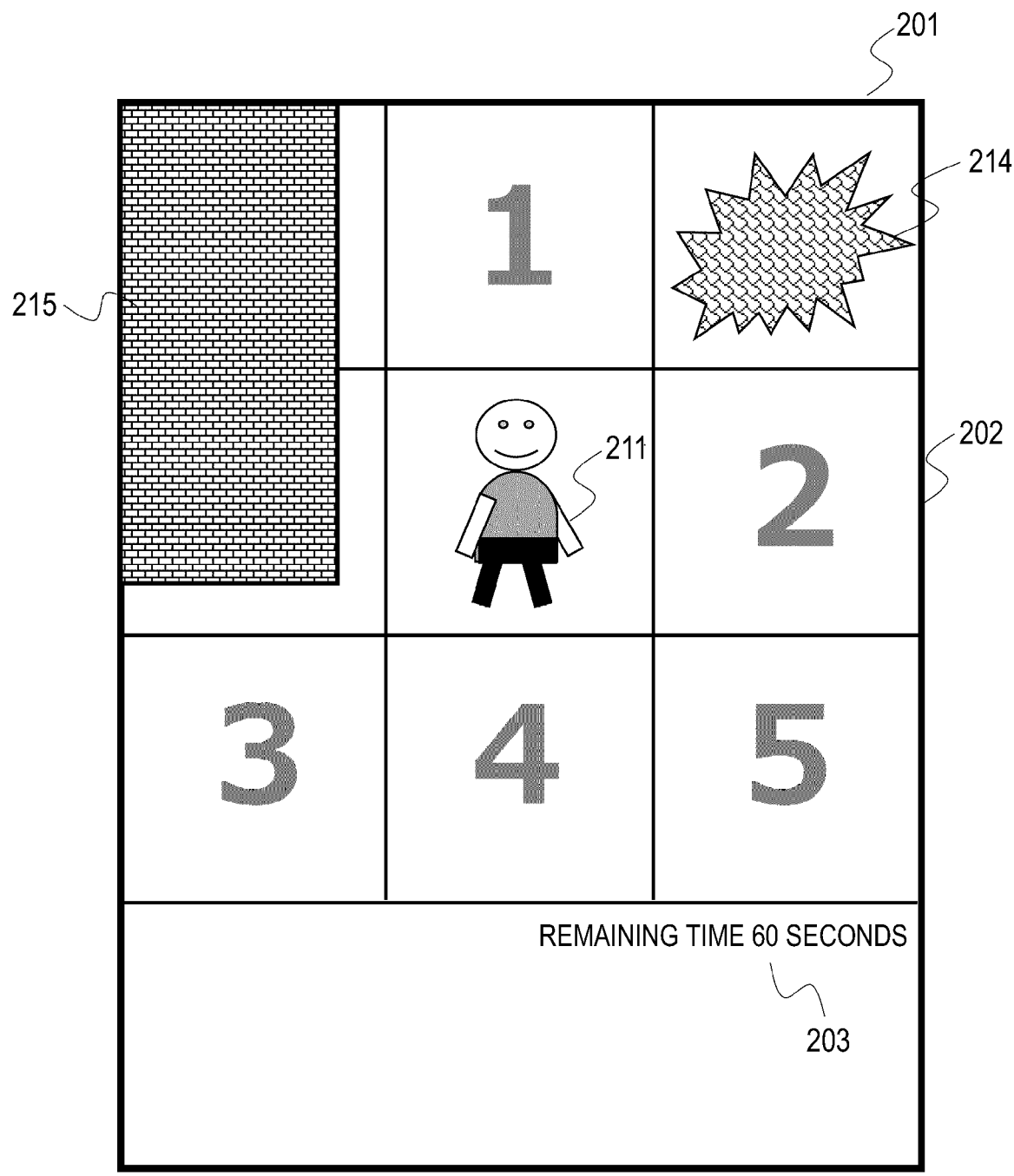
FIG. 6 is a view illustrating a state in which options are displayed in a manner of being superimposed on the display screen of the player terminal and the viewer terminal according to the first embodiment.

FIG. 6 illustrates a game image that is displayed in a case where the player asks viewers for an opinion on game progress, and desires to encourage participation. Square-shaped option frames 202 are displayed at the periphery of the game character 211. On a paper surface of the game character 211, the obstacle 214 exists in an upper-right frame, and the wall 215 exists in an upper-left frame and a left frame, and thus the game character 211 cannot move to directions of these frames (operation is impossible). According to this, options for a movement direction of the game character 211 can be allocated to operable frames with numbers of 1 to 5. In addition, a display time 203 indicating a selectable time limit of the options is disposed on a lower portion of the game image. In addition, the game image is transmitted from the content delivery server 111 to the viewer terminals 131a and 131b, and the viewers of the viewer terminals touch an option frame in a direction in which the viewers desire to move the game character 211.

Figure 7:
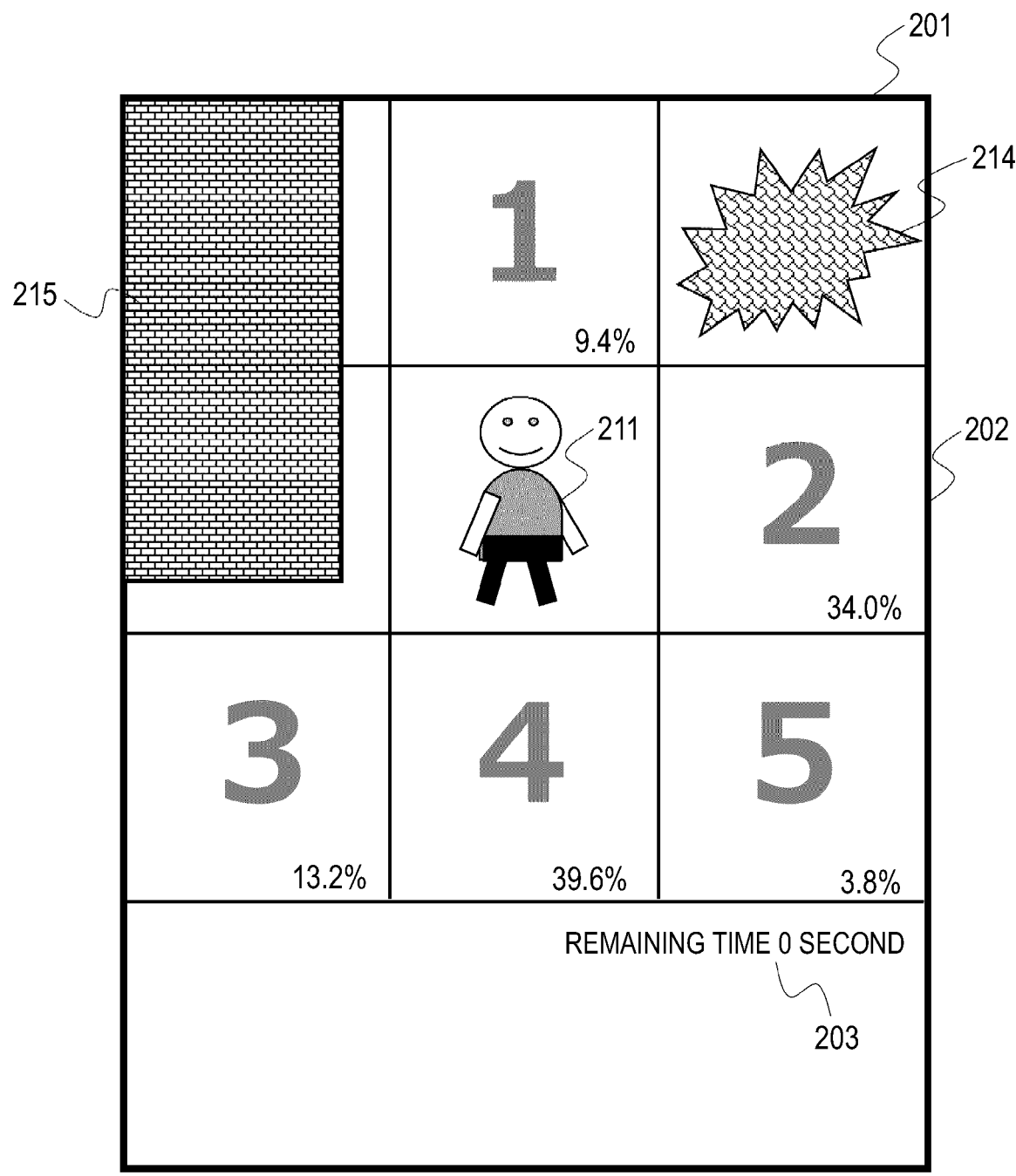
FIG. 7 is a view illustrating a state in which selection ratios are displayed in a manner of being superimposed on the display screen of the player terminal and the viewer terminal according to the first embodiment.

In FIG. 7, selection ratios of the option frames of "1" to "5" are displayed in a manner of being superimposed on the game image after the time limit. In FIG. 7, an option frame of "4" is selected in a ratio of 39.6%. Accordingly, the game character 211 moves in a direction of the option frame of "4". The control unit 113 performs control of moving the background in an opposite direction of the option frame "4" to allow the player or the viewers to view the game character 211 that is moving in the direction of "4".

<Process Flow>

Figure 8:
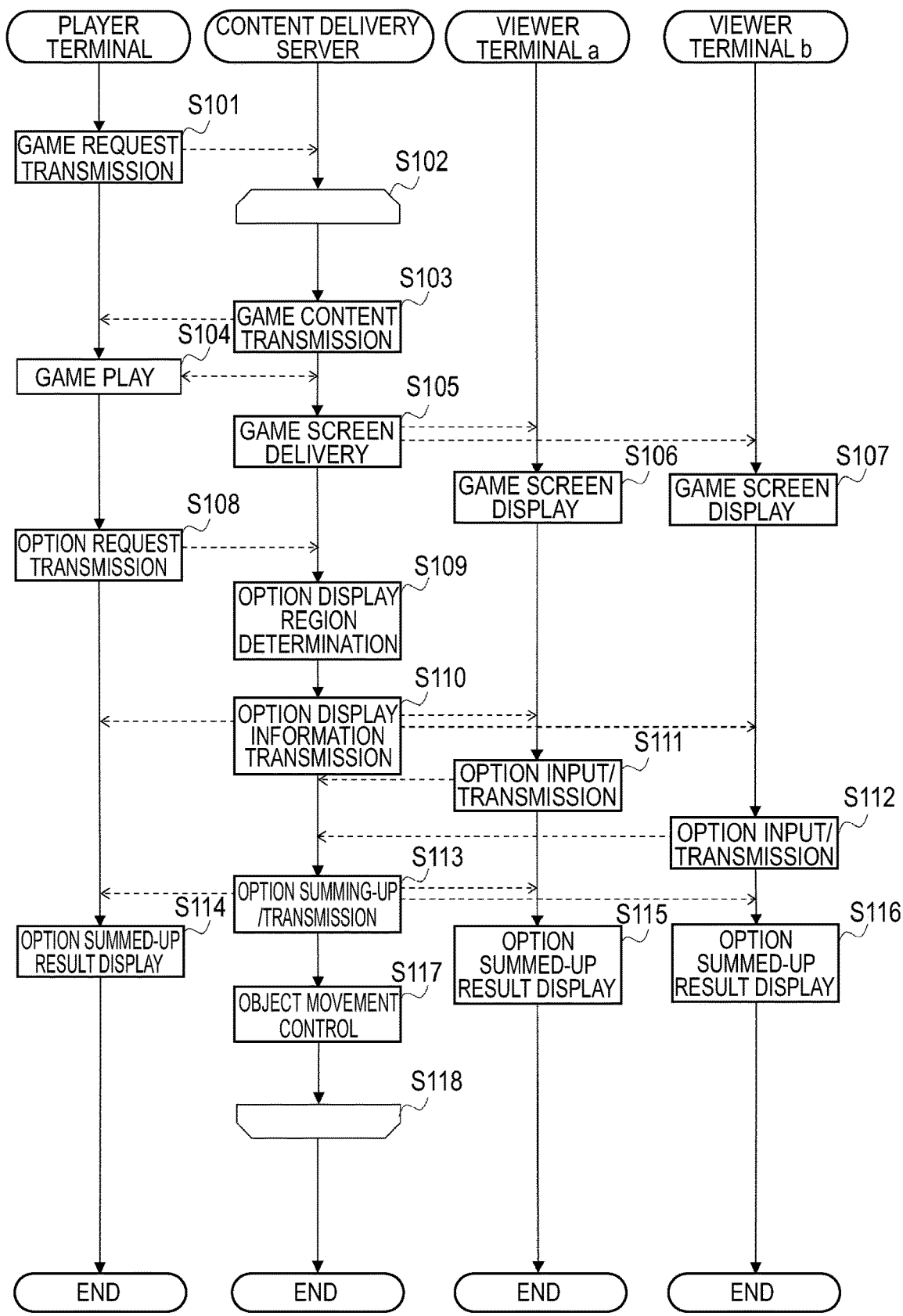
FIG. 8 is a flowchart illustrating an operation of a content delivery system according to the first embodiment.

Next, an operation of the content delivery system 1 according to the first embodiment of the present disclosure will be described with reference to a flowchart illustrated in FIG. 8. The flowchart in FIG. 8 illustrates a correlation state of respective operations of the content delivery server 111, the player terminal 121, and the viewer terminals 131a and 131b.

In step S101, the player selects game content that is desired to play among a plurality of pieces of game content provided by the content delivery server 111. The player terminal 121 transmits a game request signal for a game desired to play to the content delivery server 111.

In step S102, the content delivery server 111 performs a loop between step S102 and step S118 until play of game content is terminated.

In step S103, the content delivery server 111 transmits a display screen of game content to the player terminal 121 on the basis of the game request signal transmitted in step S101. The game content is stored in the storage unit 114, and game progress is performed by the control unit 113.

In step S104, the player performs play of the game content transmitted in step S103 in the player terminal 121. The progress of the game content is performed on an inner side of the content delivery server 111 as described above. The player manipulates the player terminal 121 while viewing a game image that is displayed. The player terminal 121 transmits a manipulation result to the content delivery server 111 as manipulation information of game play. The content delivery server 111 transmits the game image to the player terminal 121. The content delivery server 111 and the player terminal 121 perform sequential communication during play of the game.

In step S105, the content delivery server 111 delivers the game image to the viewer terminals 131a and 131b. The content delivery server 111 and the viewer terminals 131a and 131b perform sequential communication during play of the game.

In step S106, the viewer terminal 131a display the game image transmitted in step S105. In addition, in step S107, the viewer terminal 131b displays the game image transmitted in step S105 (corresponding to FIG. 2 and FIG. 5). According to this, viewers can view the game content, which is being played by the player with the player terminal 121, in real time with the viewer terminals 131a and 131b.

Next, description will be given of an operation in a case where the player asks viewers for an opinion on game progress and desires to encourage participation. In step S108, the player transmits an option request signal from the player terminal 121 to the content delivery server 111.

In step S109, the control unit 113 determines a game progress state, and determines a direction in which the game character can move as an option display region.

In step S110, the control unit 113 displays options indicating a movement direction of the game character in a manner of being superimposed on a game screen on the basis of the option display region determined in step S109 (corresponding to FIG. 3 and FIG. 6). The communication unit 112 transmits the game screen on which the options are displayed to be superimposed to the player terminal 121 and the viewer terminals 131a and 131b.

In step S111, the viewer A selects an option in the viewer terminal 131a. The viewer terminal 131a transmits the selected option to the content delivery server 111. Similarly, in step S112, the viewer B selects an option in the viewer terminal 131b. The viewer terminal 131b transmits the selected option to the content delivery server 111.

In step S113, the control unit 113 sums up the options transmitted from the viewer terminals 131a and 131b. The control unit 113 calculates a ratio indicating how many viewers select each option as a summed-up result. The control unit 113 determines a movement direction of the game character from the summed-up result. In addition, the control unit 113 displays the summed-up result in a manner of being superimposed on the game screen (corresponding to FIG. 4 and FIG. 7). The communication unit 112 transmits the game screen on which the summed-up result is superimposed to the player terminal 121 and the viewer terminals 131a and 131b.

In step S114, the player terminal 121 displays the summed-up result transmitted in step S113 in a manner of being superimposed on the game screen. In addition, in step S115, the viewer terminal 131a displays the summed-up result transmitted in step S113 in a manner of being superimposed on the game screen. In addition, in step S116, the viewer terminal 131b displays the summed-up result transmitted in step S113 in a manner of being superimposed on the game screen. Note that, the summed-up result may be displayed after being updated in real time whenever the option selected by the content delivery server 111 is transmitted from the viewer terminals 131a and 131b in step S111 or step S112. The viewers can view an updated result and can refer to the updated result when selecting an option.

In step S117, the control unit 113 performs control of moving the game character in the direction determined in step S113. With regard to movement of the game character, a position of the game character may be fixed, and the background may be moved to express relative movement.

In step S118, the content delivery server 111 performs a loop between step S118 and step S102 until a player terminates play of a game with the player terminal 121. An operation of the player terminal 121 and the viewer terminals 131a and 131b continues while the loop is performed in the content delivery server 111.

<Description of Effect>

As described above, according to the content delivery system 1 according to the first embodiment of the present disclosure, it is possible to ask respective viewers for an opinion on a movement direction by displaying options indicating a movement direction in a manner of being superimposed on the game character 211 displayed in the game screen. The viewers intuitively recognize the movement direction of the game character 211 and can select an option of the movement direction.

Note that, in the description, the movement direction of the game character 211 is determined with decision by majority of an option selected by viewers, but determination may be performed by another method. A direction for which an option is less selected may be determined, that is, determination may be performed with decision by minority. In addition, a direction of an option that is selected earliest in a time limit may be determined, or priority for determining may be raised by weighting an early selected option. In contrast, a direction of an option that is selected latest in a time limit may be determined, or priority for determining may be raised by weighting a lately selected option. In this case, a viewer will be aware of other viewers, and thus it is possible to enhance feeling of participation to game content, and it is possible to make the game content more excited.

In addition, in a case where a viewer is a pay member (pay service subscriber) of the content delivery system 1, an option may be determined by giving priority to an option selected by the pay member over an option selected by a non-pay member. In addition, lottery may be randomly performed among transmitted options to determine an option.

In addition, the options displayed at the periphery of the game character 211 are not limited to the eight directions, and may be more or less than the eight directions. In addition, it is not necessary for the directions indicated by the options to be uniform, and allocation of options may be arbitrary, for example, five directions may be allocated to a right direction, and two directions may be allocated to a left direction.

In addition, in a case where the object is a piece constituting a sliding block puzzle instead of the game character 211, the control unit 113 first determines movable piece. The control unit 113 transmits a movable piece to the viewer terminals 131a and 131b as an option, and each viewer may select the piece that is an option.

In addition, as the time limit, a player may set an arbitrary time.

Second Embodiment

Description will be given of a content delivery system 1 that displays options on a screen of a personal computer that is a viewer terminal, and performs an operation with an object on the basis of a selected result according to a second embodiment of the present disclosure. In the second embodiment, description will be made by using the content delivery system 1 according to the first embodiment.

<Game Image>

Description will be given of a game image that is transmitted from the content delivery server 111 the player terminal 121 and the viewer terminals 131a and 131b and is displayed thereon according to the second embodiment of the present disclosure with reference to FIG. 9 to FIG. 11. It is assumed that the player terminal 121 and the viewer terminals 131a and 131b are set as a personal computer.

Figure 9:
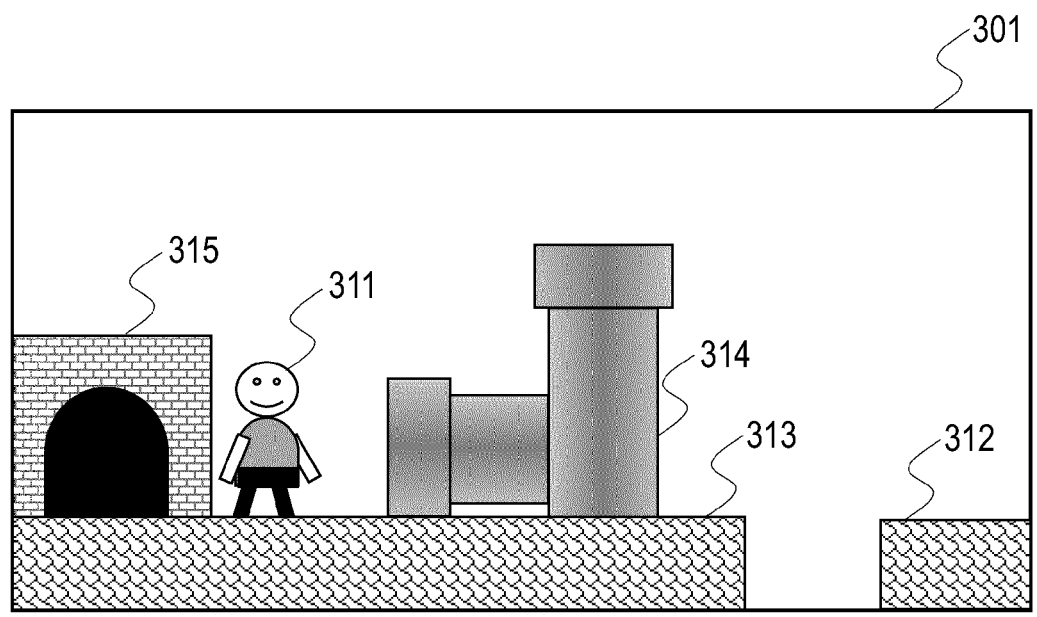
FIG. 9 is a view illustrating a display screen of a player terminal and a viewer terminal according to a second embodiment.

In FIG. 9, a game character 311 that can be manipulated by a player, grounds 312 and 313 on which the game character 311 can stand, and earthen pipe 314 and a tunnel 315 as a structure are displayed on a display screen 301 of a display of the personal computer.

Figure 10:
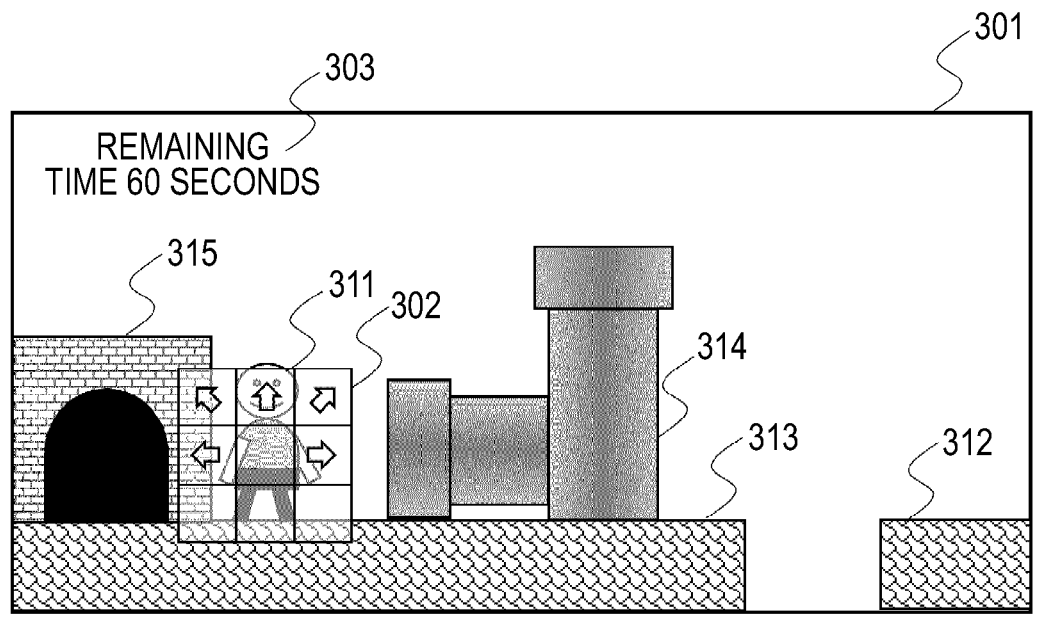
FIG. 10 is a view illustrating a state in which options are displayed in a manner of being superimposed on the display screen of the player terminal and the viewer terminal according to the second embodiment.

FIG. 10 illustrates a game image that is displayed in a case where a player asks viewers for an opinion on game progress, and desires to encourage participation. Square-shaped option frames 302 are displayed at the periphery of the game character 311. The option frames are disposed in eight directions. In the option frames, an arrow mark indicating a movement direction is displayed in a direction in which the game character 311 can move. The game character 311 stands on the ground 313, and thus the game character 311 cannot move to a direction of the ground 313, that is, a downward side. Therefore, an arrow mark is not displayed in three lower frames among the option frames. In addition, a display time 303 indicating a selectable time limit of the options is disposed on an upper portion of the game image. The game image is transmitted from the content delivery server 111 to the viewer terminals 131a and 131b, and thus viewers of viewer terminals can click an option frame in a direction in which the viewers desire to move the game character 311.

Figure 11:
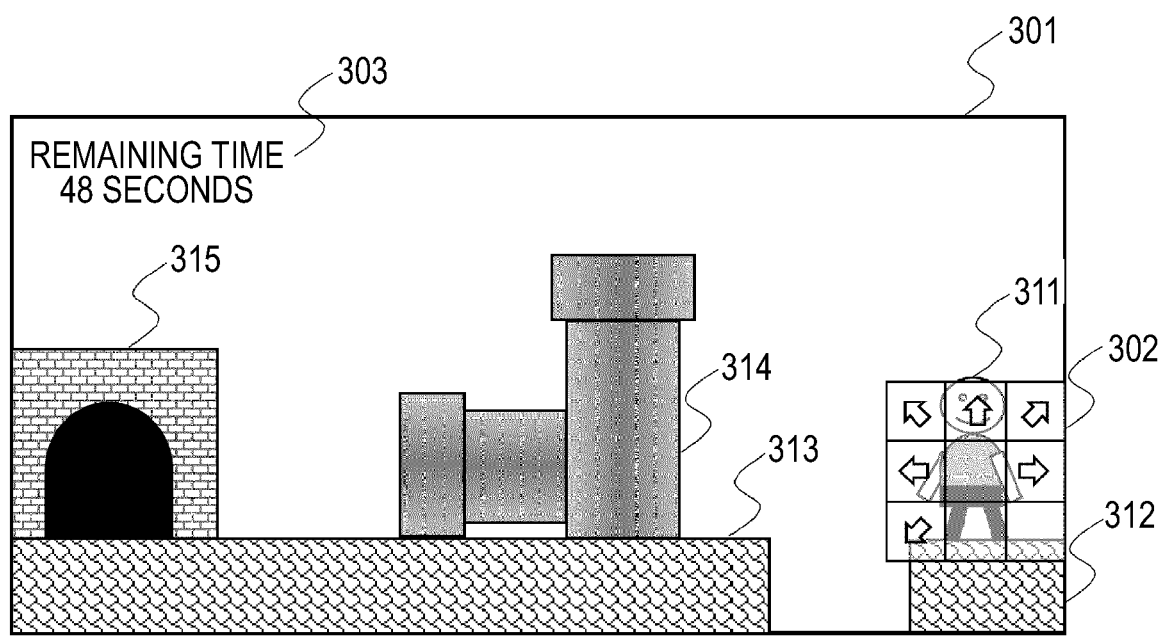
FIG. 11 is a view illustrating a state in which options are displayed in a manner of being superimposed on the display screen of the player terminal and the viewer terminal according to the second embodiment.

FIG. 11 illustrates a state in which game content progresses and the game character 311 moved to a right end of a game screen. On a lower-left side of the game character 311, a hole exists between the ground 312 and the ground 313, and thus the game character 311 can move the direction. Accordingly, the control unit 113 displays a lower-left arrow mark in a lower-left frame among the option frames. Viewers of the viewer terminals can click an option frame in a direction in which the viewers desire to move the game character 311. In addition, in a case where movement to a right direction is selected among the options, and the game character 311 moves to the right direction, the game screen may be scrolled to the right side for display.

<Description of Effect>

As described above, according to the content delivery system 2 according to the second embodiment of the present disclosure, it is possible to ask respective viewers for an option on a movement direction by displaying options indicating a movement direction in a manner of being superimposed on the game character 311 located at an arbitrary position in the game screen.

Third Embodiment

Description will be given of a content delivery system 1 that displays options on a screen of a smartphone that is a viewer terminal, and performs an operation with an object on the basis of a selected result according to a third embodiment of the present disclosure. In the third embodiment, description will be made by using the content delivery system 1 according to the first embodiment.

Figure 12:
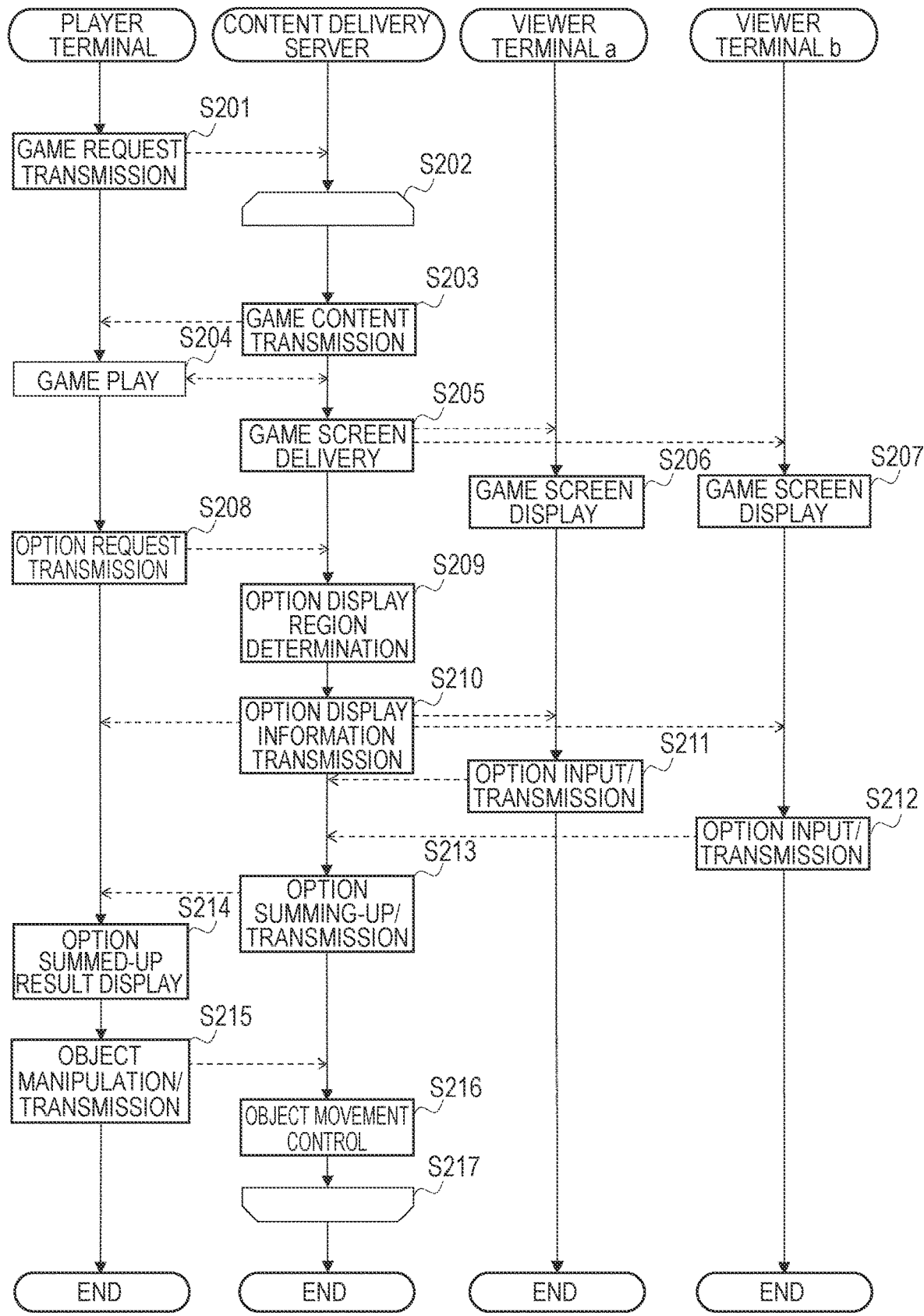
FIG. 12 is a flowchart illustrating an operation of a content delivery system according to a third embodiment.

Next, an operation of the content delivery system 1 according to the third embodiment of the present disclosure will be described with reference to a flowchart illustrated in FIG. 12. The flowchart in FIG. 12 illustrates a correlation state of respective operations of the content delivery server 111, the player terminal 121, and the viewer terminals 131a and 131b.

In step S201, a player selects game content that is desired to play among a plurality of pieces of game content provided by the content delivery server 111. The player terminal 121 transmits a game request signal for a game desired to play to the content delivery server 111.

In step S202, the content delivery server 111 performs a loop between step S202 and step S118 until play of game content is terminated.

In step S203, the content delivery server 111 transmits a display screen of game content to the player terminal 121 on the basis of the game request signal transmitted in step S201. The game content is stored in the storage unit 114, and game progress is performed by the control unit 113.

In step S204, the player performs play of the game content transmitted in step S203 in the player terminal 121. The progress of the game content is performed on an inner side of the content delivery server 111 as described above. The player manipulates the player terminal 121 while viewing a game image that is displayed. The player terminal 121 transmits a manipulation result to the content delivery server 111 as manipulation information of game play. The content delivery server 111 transmits the game image to the player terminal 121. The content delivery server 111 and the player terminal 121 perform sequential communication during play of the game.

In step S205, the content delivery server 111 delivers the game image to the viewer terminals 131a and 131b. The content delivery server 111 and the viewer terminals 131a and 131b perform sequential communication during play of the game.

In step S206, the viewer terminal 131a display the game image transmitted in step S105. In addition, in step 207, the viewer terminal 131b displays the game image transmitted in step S105. According to this, viewers can view the game content, which is being played by the player with the player terminal 121, in real time with the viewer terminals 131a and 131b.

Next, description will be given of an operation in a case where the player asks viewers for an opinion on game progress and desires to encourage participation. In step S208, the player transmits an option request signal from the player terminal 121 to the content delivery server 111.

In step S209, the control unit 113 determines a game progress state, and determines a direction in which the game character can move as an option display region.

In step S210, the control unit 113 displays options indicating a movement direction of the game character in a manner of being superimposed on a game screen on the basis of the option display region determined in step S209. The communication unit 112 transmits the game screen on which the options are displayed to be superimposed to the player terminal 121 and the viewer terminals 131a and 131b.

In step S211, the viewer A selects an option in the viewer terminal 131a. The viewer terminal 131a transmits the selected option to the content delivery server 111. Similarly, in step S212, the viewer B selects an option in the viewer terminal 131b. The viewer terminal 131b transmits the selected option to the content delivery server 111.

In step S213, the control unit 113 sums up the options transmitted from the viewer terminals 131a and 131b. The control unit 113 calculates a ratio indicating how many viewers select each option as a summed-up result. In addition, the control unit 113 displays the summed-up result in a manner of being superimposed on the game screen. The communication unit 112 transmits the game screen on which the summed-up result is superimposed to the player terminal 121.

In step S214, the player terminal 121 displays the summed-up result transmitted in step S213 in a manner of being superimposed on the game screen.

In step S215, the player manipulates the player terminal 121 with reference to the summed-up result displayed in step S214. The player terminal 121 transmits a manipulation result to the content delivery server 111 as manipulation information of game play. The content delivery server 111 transmits the game image to the player terminal 121.

In step S216, the control unit 113 performs control of moving the game character to the direction that is determined and transmitted in step S215. With regard to movement of the game character, a position of the game character may be fixed, and the background may be moved to express relative movement.

In step S217, the content delivery server 111 performs a loop between step S217 and step S202 until a player terminates play of a game with the player terminal 121. An operation of the player terminal 121 and the viewer terminals 131a and 131b continues while the loop is performed in the content delivery server 111.

<Description of Effect>

As described above, according to the content delivery system 1 according to the second embodiment of the present disclosure, the player can manipulate movement of the game character with own intention of the player with reference to information of an option selected by the viewer terminals 131a and 131b.

(Program)

Figure 13:
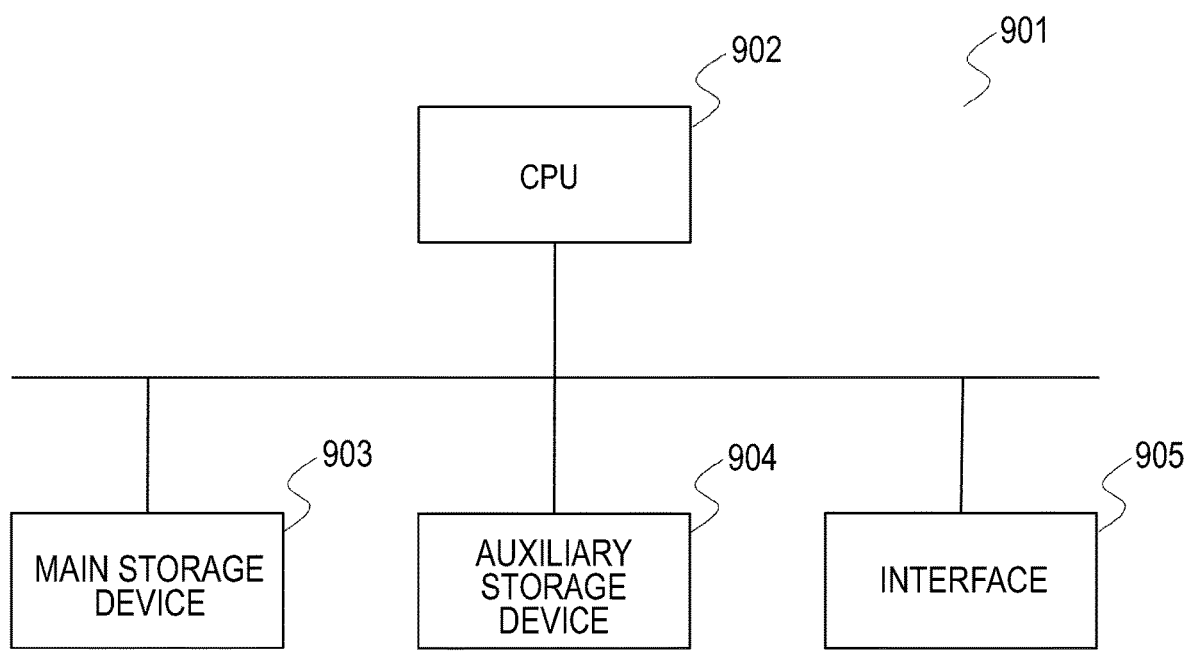
FIG. 13 is a schematic block diagram illustrating a configuration of a computer according to an embodiment.

FIG. 13 is a block diagram illustrating a configuration of a computer 901. The computer 901 includes a CPU 902, a main storage device 903, an auxiliary storage device 904, and an interface 905.

Here, details of a program for realizing respective functions constituting the content delivery server 111 according to the embodiments of the present disclosure will be described.

The content delivery server 111 is mounted in the computer 901. In addition, operations of respective constituent elements of the content delivery server 111 are stored in the auxiliary storage device 904 in a program format. The CPU 902 reads out the program from the auxiliary storage device 904 and develops the program in the main storage device 903, and executes the above-described process in accordance with the program. In addition, the CPU 902 secures a storage region corresponding to the above-described storage unit in the main storage device 903 in accordance with the program.

Specifically, the program is a content delivery program for delivering a content screen played in a player terminal to a plurality of viewer terminals by the computer 901. The program causes a computer to execute a step of causing the viewer terminals to display options for manipulating an object in the content, a step of receiving a result selected among the options from the viewer terminals, a step of performing an operation of the object in the content on the basis of the selection result, and a step of delivering a content screen after the operation of the object to the player terminal and the viewer terminals.

Note that, the auxiliary storage device 904 is an example of non-transitory medium. As another example of the non-transitory medium, a magnetic disk, a magneto-optical disc, a CD-ROM, a DVD-ROM, a semiconductor memory, and the like which are connected through the interface 905 can be exemplified. In addition, in a case where the program is delivered to the computer 901 through a network, the computer 901 to which the program is delivered may develop the program in the main storage device 903, and may execute the above-described process.

In addition, the program may be configured to realize parts of the above-described functions. In addition, the program may be a program that realizes the above-described functions in a combination with another program stored in the auxiliary storage device 904 in advance, a so-called differential file (differential program).

The embodiments can be carried out in various other aspects, and various omissions, substitutions, and changes can be made in a range not departing from the gist of the invention. The embodiments and modifications thereof are included in the invention described in the appended claims and the equivalents thereof as well as included in the scope and the gist of the invention.

The invention claimed is:

1. A content delivery server communicatively coupled to a player terminal and a plurality of viewer terminals, said content delivery server being configured to maintain a position of an object and generate and simultaneously provide, on each of the plurality of viewer terminals, a content screen of content played by the player terminal, the content delivery server comprising:

a control unit, the control unit configured to cause the viewer terminals to display, in the content interface of each of the viewer terminals, a plurality of interface options for manipulating the object in the content; and a communication unit configured to receive, from the viewer terminals, a plurality of results selected on a viewer interface from among the displayed plurality of interface options, and is configured to reconcile the plurality of results based on a current selection method, wherein the control unit is configured to receive, from the player terminal, an instruction to cause the viewer terminals to display the plurality of interface options, and, as a result of the instruction, is configured to cause the viewer terminals to display the options, wherein the control unit is configured to update, in the content delivery server, the position of the object based on a selection result based on the plurality of results, and wherein the content delivery server is further configured to provide a content screen, after an operation of the object is delivered from the communication unit, to the player terminal and the viewer terminals.

2. The content delivery server according to claim 1, wherein the control unit is further configured to arrange the options at the periphery of the object, display the options in an operable direction of the object, and perform an operation of the object in the content on the basis of the selection result.

3. The content delivery server according to claim 2, wherein the control unit is further configured to determine an inoperable direction of the object from a progress state of the content, and is configured not to display the options in the inoperable direction.

4. The content delivery server according to claim 1, wherein the control unit is further configured to determine the operation of the object in accordance with a decision by majority or a decision by minority of the plurality of results from the plurality of viewer terminals.

5. The content delivery server according to claim 1, wherein the control unit is further configured to determine the operation of the object by giving priority to a selection result to an early one or a late one among the plurality of results from the plurality of viewer terminals.

6. The content delivery server according to claim 1, wherein the control unit is further configured to determine the operation of the object by giving priority to a selection result from a viewer terminal of a pay service subscriber among the plurality of results from the plurality of viewer terminals.

7. The content delivery server according to claim 1, wherein the control unit is further configured to determine the operation of the object in accordance with a lottery from the plurality of results from the plurality of viewer terminals.

8. The content delivery server according to claim 3, wherein the control unit is configured to display information based on the plurality of results transmitted from the plurality of viewer terminals by superimposing the information on the content screen.

9. The content delivery server according to claim 8, wherein the control unit displays information based on the selection result by superimposing the information on the options.

10. The content delivery server according to claim 9, wherein the information based on the selection result is a ratio of the plurality of results which are selected.

11. The content delivery server according to claim 1, wherein the control unit is configured to set a display time of the options within a period of time determined in advance.

12. A content delivery method for delivering a content screen of content played by a player terminal to a plurality of viewer terminals, the content delivery method comprising steps of:
with a control unit of a content delivery server, causing the viewer terminals to simultaneously display, in a content interface of each of the viewer terminals, options for manipulating an object in the content by the control unit in accordance with an instruction from the player terminal, said object being provided at a position;
receiving, by a communication unit of the content delivery server, from each of the viewer terminals, a result selected among the options displayed on the content interfaces of each of the viewer terminals;
reconciling, on the content delivery server, the results received from each of the viewer terminals and determining a selection result based on a current selection method, and performing an operation of the object in the content on the basis of the selection result by the control unit, said operation comprising updating, in the content delivery server, with the control unit, the position of the object; and
with the content delivery server, delivering a content screen after the operation of the object to the player terminal and the viewer terminals by the communication unit.

13. A non-transitory computer readable storage medium storing a content delivery program for delivering a content screen of content played by a player terminal to a plurality of viewer terminals, the content delivery program causing a computer processor to execute steps of:
causing the viewer terminals to simultaneously display, in a content interface of each of the viewer terminals, options for manipulating an object in the content in accordance with an instruction from the player terminal, said object being provided at a position;
receiving, from each of the viewer terminals, a result selected among the options displayed on the content interfaces of each of the viewer terminals;
reconciling the results received from each of the viewer terminals and determining a selection result based on a current selection method, and performing an operation of the object in the content on the basis of the selection result, said operation comprising updating, with the processor, the position of the object; and
delivering a content screen after the operation of the object to the player terminal and the viewer terminals.

14. The content delivery server according to claim 1, wherein
the control unit is configured to cause the viewer terminals to display options for manipulating the object in the content in accordance with an instruction from the player terminal; and
wherein the control unit is configured to cause the player terminal to display the selection result, and is configured to perform the operation of the object in the content on the basis of the instruction from the player terminal.

15. The content delivery method according to claim 12, further comprising:
displaying the selection result on the player terminal and performing the operation of the object in the content on the basis of an instruction from the player terminal by the control unit.

16. The non-transitory computer readable storage medium according to claim 13, further comprising:
displaying the selection result on the player terminal and performing the operation of the object in the content on the basis of the instruction from the player terminal.

* * * * *